(12) United States Patent (10) Patent No.: US 10,200,180 B2
Nigam et al. (45) Date of Patent: *Feb. 5, 2019

(54) METHOD AND APPARATUS FOR PERFORMING UPLINK HYBRID AUTOMATIC REPEAT REQUEST OPERATION IN AN ASYMMETRIC MULTICARRIER COMMUNICATION NETWORK ENVIRONMENT

(71) Applicant: Samsung Electronics Co., Ltd., Suwon-si (KR)

(72) Inventors: Anshuman Nigam, Bangalore (IN); Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,034

(22) Filed: May 22, 2017

(65) Prior Publication Data

US 2017/0324533 A1 Nov. 9, 2017

Related U.S. Application Data

(63) Continuation of application No. 14/443,041, filed as application No. PCT/KR2013/010299 on Nov. 13, 2013, now Pat. No. 9,660,788.

(30) Foreign Application Priority Data

Nov. 14, 2012 (IN) .......................... 4755/CHE/2012
Oct. 30, 2013 (IN) .......................... 4755/CHE/2012

(51) Int. Cl.
*H04L 5/00* (2006.01)
*H04L 1/18* (2006.01)

(52) U.S. Cl.
CPC .......... *H04L 5/0055* (2013.01); *H04L 1/1812* (2013.01); *H04L 1/1861* (2013.01); *H04L 1/1896* (2013.01); *H04L 1/1887* (2013.01)

(58) Field of Classification Search
CPC ... H04L 1/1896; H04L 5/0055; H04L 1/1812; H04L 1/1861; H04L 1/1887
See application file for complete search history.

(56) References Cited

U.S. PATENT DOCUMENTS

2009/0010198 A1* 1/2009 Boariu ................. H04L 1/1854
370/315
2010/0195552 A1 8/2010 Ho
(Continued)

FOREIGN PATENT DOCUMENTS

KR 20110120807 A 11/2011
KR 20120060940 A 6/2012

OTHER PUBLICATIONS

Foreign Communication From a Related Counterpart Application, PCT Application No. PCT/KR2013/010299, International Search Report dated Feb. 13, 2014, 4 pages.

*Primary Examiner* — Brian D Nguyen

(57) ABSTRACT

The present invention provides a method and apparatus for performing an uplink Hybrid Automatic Repeat Request (HARQ) operation in an asymmetric multicarrier communication network environment. In one embodiment, a method includes transmitting a HARQ packet to a base station in a transmit time interval of one of a plurality of partitions of an uplink allocation interval on a first carrier by a mobile station. Then, the method includes determining a partition of the uplink allocation interval in which the HARQ packet is transmitted, and determining a HARQ feedback region in the subsequent downlink subframe corresponding to the determined partition. The method further includes receiving HARQ feedback information in the deter- (Continued)

mined HARQ feedback region in the subsequent downlink subframe on a second carrier from the base station.

14 Claims, 6 Drawing Sheets

(56) References Cited

U.S. PATENT DOCUMENTS

| | | |
|---|---|---|
| 2011/0096735 A1 | 4/2011 | Damnjanovic et al. |
| 2012/0042221 A1 | 2/2012 | Kim et al. |
| 2012/0044921 A1 | 2/2012 | Chung et al. |
| 2012/0069795 A1 | 3/2012 | Chung et al. |
| 2012/0307758 A1 | 12/2012 | Moon et al. |
| 2012/0314679 A1* | 12/2012 | Lee .................. H04L 5/0053 370/329 |
| 2012/0327783 A1 | 12/2012 | Moon et al. |
| 2013/0022011 A1* | 1/2013 | Enomoto ............ H04L 1/0026 370/329 |
| 2013/0044722 A1 | 2/2013 | Kang et al. |
| 2013/0044725 A1 | 2/2013 | Chun et al. |
| 2013/0058291 A1 | 3/2013 | Ahn et al. |
| 2013/0083707 A1* | 4/2013 | Wang ............... H04W 72/1289 370/280 |
| 2013/0235808 A1* | 9/2013 | Earnshaw ........... H04L 1/0003 370/329 |

\* cited by examiner

METHOD AND APPARATUS FOR PERFORMING UPLINK HYBRID AUTOMATIC REPEAT REQUEST OPERATION IN AN ASYMMETRIC MULTICARRIER COMMUNICATION NETWORK ENVIRONMENT

CROSS-REFERENCE TO RELATED APPLICATION(S)

The present application claims priority under 35 U.S.C. § 120 to U.S. patent application Ser. No. 14/443,041 filed May 14, 2015 now U.S. Pat. No. 9,660,788 and under 35 U.S.C. § 365 to International Patent Application No. PCT/KR2015/010299 filed Nov. 13, 2013, entitled "METHOD AND APPARATUS FOR PERFORMING UPLINK HYBRID AUTOMATIC REPEAT REQUEST OPERATION IN AN ASYMMETRIC MULTICARRIER COMMUNICATION NETWORK ENVIRONMENT", and, through International Patent Application No. PCT/KR2015/010299, to Indian Patent Application No. 4755/CHE/2012 filed Oct. 30, 2013, and to Indian Patent Application No. 4755/CHE/2012 filed Nov. 14, 2012, each of which are incorporated herein by reference into the present disclosure as if fully set forth herein.

TECHNICAL FIELD

The present invention generally relates to the field of asymmetric multicarrier communication system, and more particularly relates to performing uplink hybrid automatic repeat request (HARQ) operation in an asymmetric multicarrier communication network environment.

BACKGROUND ART

In the recent years, several broadband wireless technologies have been developed to meet growing number of broadband subscribers and to provide more and better applications and services. For example, the Third Generation Partnership Project 2 (3GPP2) developed Code Division Multiple Access 2000 (CDMA 2000), 1× Evolution Data Optimized (1×EVDO) and Ultra Mobile Broadband (UMB) systems. The 3$^{rd}$ Generation Partnership Project (3GPP) developed Wideband Code Division Multiple Access (WCDMA), High Speed Packet Access (HSPA) and Long Term Evolution (LTE) systems. The Institute of Electrical and Electronics Engineers (IEEE) developed Mobile Worldwide Interoperability for Microwave Access (WiMAX) systems. As more and more people become users of mobile communication systems and more and more services are provided over these systems, there is an increasing need for mobile communication system with large capacity, high throughput, lower latency and better reliability.

DISCLOSURE OF INVENTION

Technical Problem

Super Mobile Broadband (SMB) system based on millimeter waves, i.e., radio waves with wavelength in range of 1 millimeter (mm) to 10 mm, which corresponds to a radio frequency of 30 Gigahertz (GHz) to 300 GHz, is a candidate for next generation mobile communication technology as vast amount of spectrum is available in millimeter Wave band. In general, an SMB network consists of multiple SMB base stations (BSs) that cover a geographic area. In order to ensure good coverage, SMB base stations need to be deployed with higher density than macro-cellular base stations. In general, SMB base stations are recommended to be deployed roughly at the same site-to-site distance as microcell or Pico-cell deployment in an urban environment. Typically, transmission and/or reception in an SMB system are based on narrow beams, which suppress the interference from neighboring SMB base stations and extend the range of an SMB link by utilizing directional antennas. However due to high path loss, heavy shadowing and rain attenuation reliable transmission at higher frequencies is one of the key issues that need to be overcome in order to make SMB system a practical reality.

Lower frequencies in a cellular band having robust link characteristics can be utilized with higher frequencies in an mmWave band to overcome reliability issues in the SMB system. In an asymmetric multicarrier communication network environment, a mobile station (MS) communicates with a base station (BS) using asymmetric multiband carriers consisting of at least one low frequency carrier in the cellular band and at least one high frequency carrier in the mmWave band. The primary carrier i.e., carrier operating on low frequencies and the secondary carrier i.e., carrier operating on high frequencies may be transmitted by same BS or different BS. Since the transmission characteristics of low frequency carriers in the cellular band and high frequency carriers in the mmWave band are quite different, transmission time intervals (TTIs) and frame structures for the primary carrier and the secondary carrier may not be the same.

In an asymmetric multicarrier SMB network, low frequency carrier in a cellular band can be used to signal Hybrid Automatic Repeat Request (HARQ) control information (e.g., resource allocation (RA) and/or HARQ feedback information or both) in order to gain on transmission reliability which is one of the prime challenges in mmWave transmission. In the conventional multicarrier system in which control regions of a primary carrier are used for transmitting RA and HARQ control information for a HARQ packet transmitted on a secondary carrier, HARQ operation timing is same as that of primary carrier as transmit time interval (TTI), feedback interval and retransmission interval for transmission of HARQ packet on the secondary carrier are same as that of the primary carrier.

An exemplary conventional multicarrier HARQ operation in uplink (UL) is illustrated in FIG. 1c. The resources are allocated for packet transmission on a secondary UL carrier using a packet data control channel (PDCCH) transmitted on a primary carrier. The resources are allocated every scheduling interval for time duration equal to the scheduling interval. Generally, the time duration for which the resources are allocated is referred as UL allocation interval. The UL allocation interval and the scheduling interval are equal to 1 subframe i.e. 1 ms. The PDCCH in a subframe on the primary carrier indicates resources for an UL allocation interval of a secondary UL carrier wherein the UL allocation interval is at a fixed offset from the subframe in the primary carrier indicating resources for the UL allocation interval.

One HARQ process is assigned to a single mobile station in UL allocation interval in the secondary carrier. One HARQ process constitutes one HARQ packet transmission (including the retransmissions and its feedback). One HARQ packet spans duration of UL allocation interval in time and a single HARQ packet is allowed to be transmitted by the mobile station. One allocation interval is also the transmit time interval (TTI) for a HARQ packet.

In an exemplary UL HARQ operation, the HARQ packet transmitted by the mobile station in the UL allocation interval is received and processed by the base station and the HARQ feedback is sent by the base station after fixed number of subframes using a HARQ feedback channel (i.e., Physical HARQ Feedback Indicator Channel (PHICH)) on the primary DL carrier. Based on the HARQ feedback of the previous transmission, the mobile station determines whether to retransmit the HARQ packet or not. In case of uplink HARQ operation, the UL allocation interval for retransmitting the HARQ packet is at a fixed place with respect to previous transmission and same resources as assigned for the previous transmission are used. The base station may change the resources in the UL allocation interval corresponding to the retransmission of HARQ packet. Multiple HARQ processes may exist between the mobile station and the base station. All HARQ processes follow same method of HARQ operation, viz. resource adaptation after processing previous HARQ packet transmission, retransmission TTI is present after the TTI in which the HARQ feedback is received by the mobile station, and transmission of HARQ packet is performed after the HARQ feedback is received by the mobile station.

In case of asymmetric multicarrier communication network, transmit time interval (TTI), feedback interval and retransmission interval for transmission of a HARQ packet on a high frequency carrier are much smaller than those of transmission of a HARQ packet on a low frequency carrier. Therefore, a method of UL HARQ operation in an asymmetric multicarrier communication network system is needed.

Solution to Problem

In accordance with an aspect of the present disclosure, a method of performing a uplink Hybrid Automatic Repeat Request (HARQ) operation in an asymmetric multicarrier communication network environment. The method includes: transmitting a HARQ packet to a base station in a transmit time interval of one of a plurality of partitions of a uplink allocation interval on a first carrier by a mobile station; determining a HARQ feedback region in a subsequent downlink subframe for receiving HARQ feedback information corresponding to the transmitted HARQ packet, wherein the subsequent downlink subframe is partitioned into a plurality of HARQ feedback regions; and receiving the HARQ feedback information in the determined HARQ feedback region in the subsequent downlink subframe on a second carrier from the base station.

In accordance with another aspect of the present disclosure, a method of performing a uplink Hybrid Automatic Repeat Request (HARQ) operation in an asymmetric multicarrier communication network environment. The method includes: monitoring, by a base station, a transmit time interval of one of a plurality of partitions of an uplink allocation interval on a first carrier on which a HARQ packet transmission is expected from a mobile station; determining a HARQ feedback region in a subsequent downlink subframe in which HARQ feedback information corresponding to the HARQ packet transmission is to be transmitted, wherein the subsequent downlink subframe is partitioned into a plurality of HARQ feedback regions; and transmitting the HARQ feedback information in the determined HARQ feedback region in the subsequent downlink subframe on a second carrier to the mobile station.

The drawings described herein are for illustration purposes only and are not intended to limit the scope of the present disclosure in any way.

MODE FOR THE INVENTION

The present invention provides a method and apparatus for performing uplink Hybrid Automatic Repeat Request (HARQ) operation in an asymmetric multicarrier communication network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilised and that changes may be made without departing from the scope of the present invention. The following detailed description is, therefore, not to be taken in a limiting sense, and the scope of the present invention is defined only by the appended claims.

Figure 1A:
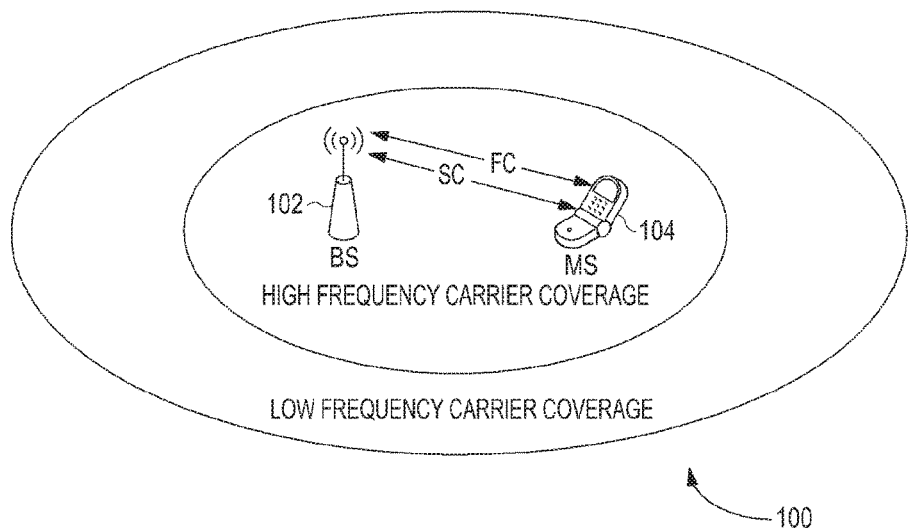
FIG. 1a is a schematic diagram depicting an asymmetric multicarrier communication network system in which data on a first carrier and a second carrier are transmitted by same base station (BS), in context of the invention.
Figure 1B:
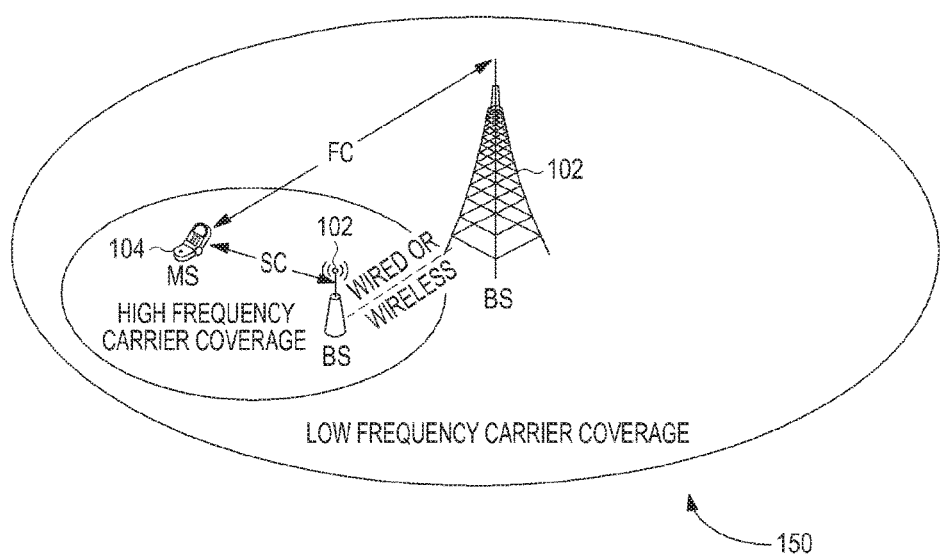
FIG. 1b is a schematic diagram depicting another asymmetric multicarrier communication network system in which data on a first carrier and a second carrier are transmitted by different BSs, in the context of the invention.
Figure 1C:
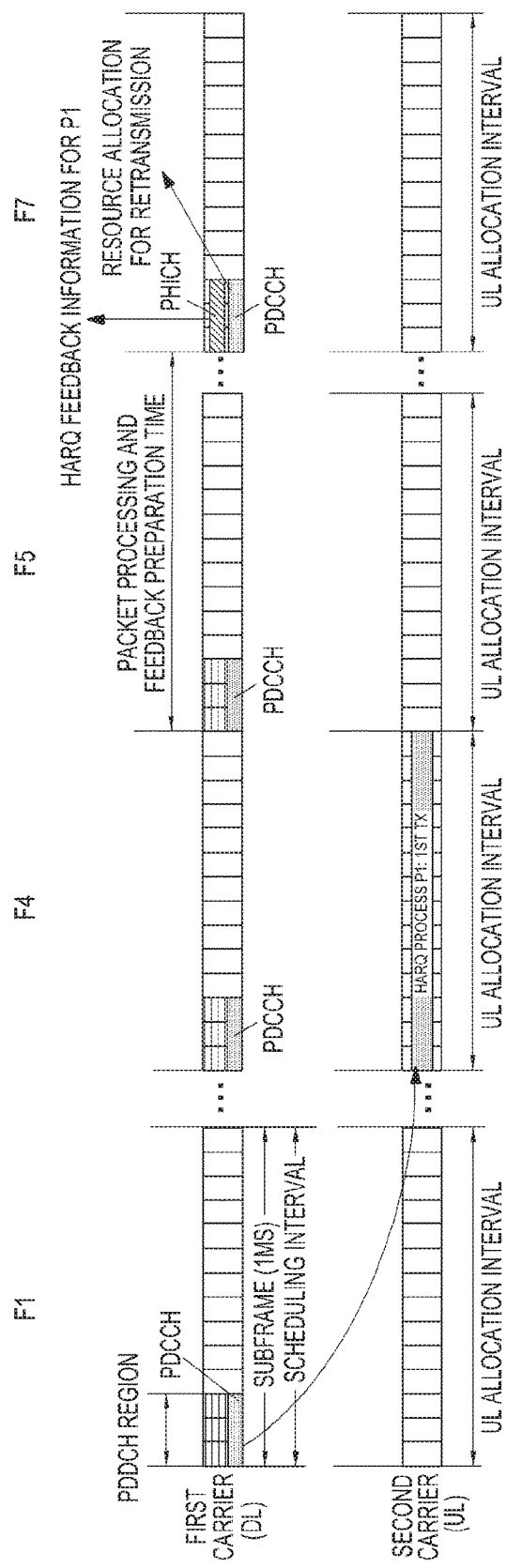
FIG. 1c is schematic representation depicting a conventional uplink HARQ operation.

In an asymmetric multicarrier communication network, a mobile station (MS) communicates with a base station (BS) using asymmetric carriers consisting of at least one low frequency carrier in a cellular band and at least one high frequency carrier in a millimeter Wave band. The carrier operating on low frequency (herein after referred to as second carrier) is used to transmit control information including resource allocation information and HARQ control information (e.g., HARQ feedback information) for a carrier operating on high frequency (hereinafter referred to as first carrier). The first carrier and the second carrier may be transmitted by same base station (BS) or different BS. FIG. 1a is a schematic diagram 100 depicting an asymmetric multicarrier communication network system in which data on the first carrier and the second carrier are transmitted and received by same BS 102. FIG. 1b is a schematic diagram 150 depicting another asymmetric multicarrier communication network system in which data on the first carrier and second carrier are transmitted and received by different BSs 102. In asymmetric multicarrier communication network, transmit time interval (TTI), HARQ feedback interval, and HARQ packet retransmission interval for the low frequency carrier are different than those of the high frequency carrier. The transmit time interval is a time duration in which a HARQ packet is transmitted. The HARQ feedback interval is time duration between HARQ packet transmission and HARQ feedback reception. The HARQ packet retransmission interval is time duration between initial transmission of HARQ packet and retransmission of HARQ packet in case HARQ packet is not received by the base station 102.

The present invention is applicable to any asymmetric multicarrier communication network system, wherein at least one of transmit time interval (TTI), HARQ feedback interval, and HARQ packet retransmission interval on the first carrier are different than HARQ packet transmission on a second carrier. For the purpose explanation, low frequency carrier operation as defined in Third Generation Partnership Project (3GPP) Long Term Evolution (LTE) system is considered. However, the present invention is equally applicable to any other cellular broadband system.

Figure 2:
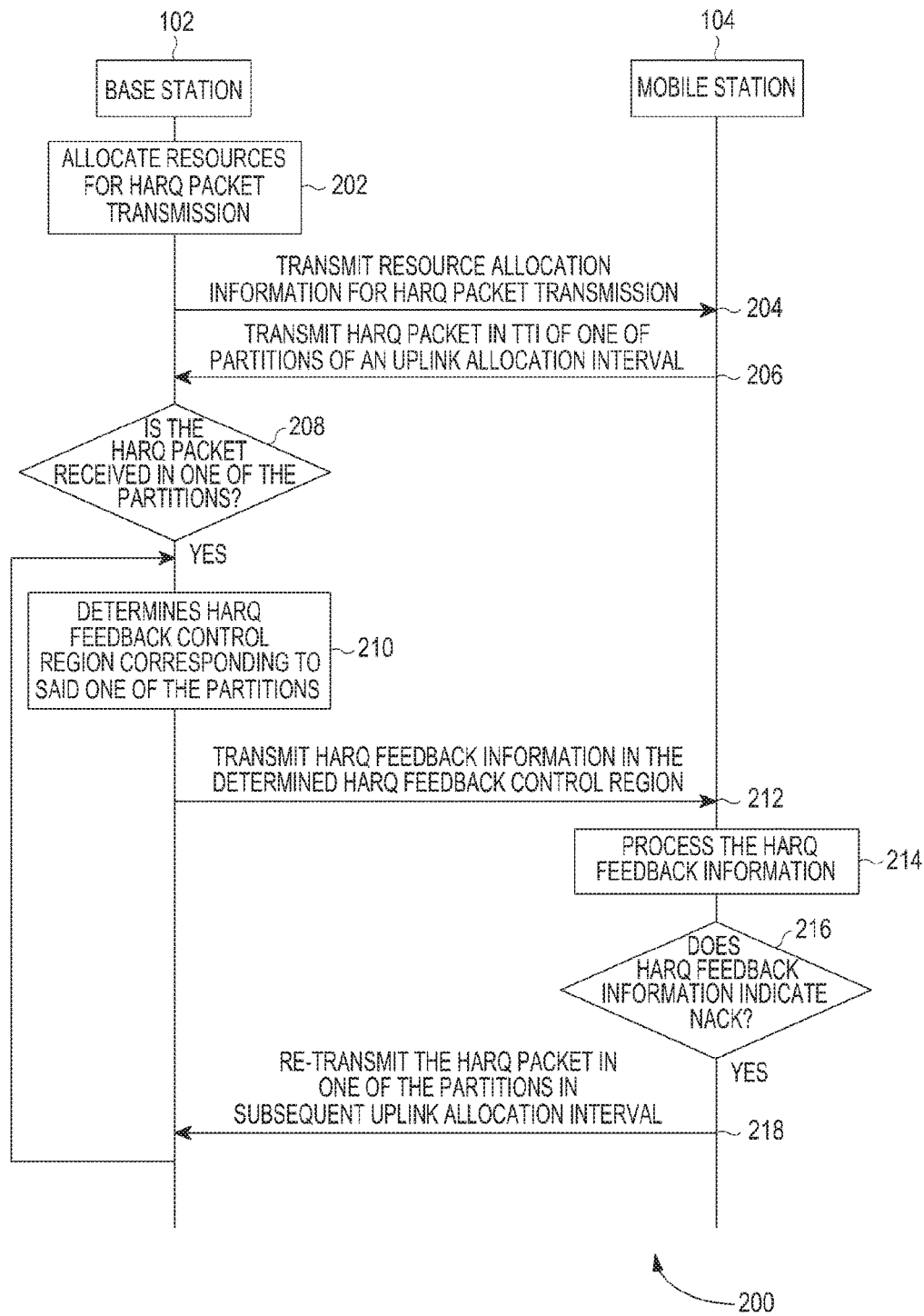
FIG. 2 is a flow diagram illustrating an exemplary method of performing uplink HARQ operation in an asymmetric multicarrier communication network environment, according to one embodiment.

FIG. 2 is a flow diagram 200 illustrating an exemplary method of performing uplink HARQ operation in an asymmetric multicarrier communication network environment, according to one embodiment. At step 202, the base station 102 allocates resources for transmission of a new HARQ packet in an uplink allocation interval on a first carrier (i.e., Super Mobile Broadband (SMB) carrier). The uplink allocation interval on the first carrier is time duration for which a resource allocation control region in a downlink subframe of the second carrier indicates resources allocated for transmission of HARQ packets in uplink direction on the first carrier. The uplink allocation interval comprises a plurality of transmit time intervals and may be offset from the downlink subframe of the second carrier by a value 'T2'. Each transmit time interval in the uplink allocation interval carries one or more HARQ processes and each HARQ process carries a single HARQ packet.

According to the present invention, the uplink allocation interval is partitioned into a plurality of partitions, each partition comprises one or more transmit time intervals. All the plurality of partitions may or may not have equal number of transmit time intervals. The number of partitions in an uplink allocation interval on the first carrier is equal to number of HARQ feedback regions in a downlink subframe on the second carrier. According to the present invention, each downlink subframe on the second carrier consists of multiple time division multiplexed HARQ feedback control regions (also referred to as Physical Hybrid-ARQ Indicator Channel (PHICH) regions)). The multiple HARQ feedback control regions spans the entire downlink sub frame. Legacy PHICH region contains one of the multiple HARQ feedback control regions in said each downlink sub frame. The remaining HARQ feedback control regions belong to a DL SCH region in said each downlink subframe. Each of the plurality of partitions in the uplink allocation interval of the first carrier corresponds to one of the plurality of HARQ feedback control regions in the subsequent downlink subframe of the second carrier.

The uplink allocation interval is partitioned into multiple partitions such that each partition in a '$n^{th}$' uplink allocation interval corresponding to a downlink subframe '$F_n$' starts at an offset greater than or equal to time required to process HARQ feedback information and generate a HARQ packet for retransmission by the mobile station 104 from end of a corresponding HARQ feedback control region in the downlink subframe '$F_n$', and ends at an offset greater than or equal to time required to receive the HARQ packet and prepare HARQ feedback information by the base station 102 before the start of corresponding HARQ feedback control region in a subsequent downlink subframe '$F_{n+1}$'.

In an exemplary implementation, the first transmit time interval of the first partition in the '$n^{th}$' uplink allocation interval is the first transmit time interval of the '$n^{th}$' uplink allocation interval. The first condition for start of the first partition is satisfied by having offset equal to time duration (T2) between the start of the '$n^{th}$' uplink allocation interval of the first carrier and the end of the resource allocation control region in the downlink subframe '$F_n$' of the second carrier. The time duration T2 is equal to time required to prepare a HARQ packet after receiving resource allocation information from the base station 102 in a resource allocation region of the downlink subframe '$F_n$'. It can be noted that, the time duration 'T2' is greater than equal to time 'T3' required to process HARQ feedback information and generate the HARQ packet for retransmission by the mobile station 104. The last transmit time interval of the first partition is the '$n^{th}$' transmit time interval of the '$n^{th}$' uplink allocation interval of the first carrier corresponding to a downlink subframe which ends at an offset 'T1' from beginning of first HARQ feedback control region in the downlink frame '$F_{n+1}$' of the second carrier. This satisfies the second condition for the end of first partition. The offset 'T1' is equal to time required to receive the HARQ packet and prepare HARQ feedback information by the base station 102.

The first slot of the second partition in the '$n^{th}$' uplink allocation interval is immediate first transmit time interval following the end of the first partition in the '$n^{th}$' uplink allocation interval. The first condition for start of the second partition is satisfied by appropriate selection of end boundary of a second HARQ feedback control region in the downlink subframe '$F_n$' of the second carrier. The last transmit time interval of the second partition is '$p^{th}$' transmit time interval of the '$n^{th}$' uplink allocation interval which ends at an offset greater than or equal to 'T1' from the beginning of the second HARQ feedback control region in the downlink subframe '$F_{n+1}$' of the second carrier. This satisfies the second condition for end of the second partition.

Similarly, the first slot of the third partition in the '$n^{th}$' uplink allocation interval is immediate first transmit time interval following the end of the second partition in the '$n^{th}$' uplink allocation interval. The first condition for start of the third partition is satisfied by appropriate selection of end boundary of a third HARQ feedback control region in the downlink subframe '$F_n$' of the second carrier. The last transmit time interval of the third partition is '$p^{th}$' transmit time interval of the '$n^{th}$' uplink allocation interval which ends at an offset greater than or equal to 'T1' from the beginning of the third HARQ feedback control region in the downlink subframe of the second carrier. This satisfies the second condition for end of the third partition.

For additional partitions (other than the last partition), the first transmit time interval of the '$x^{th}$' partition of the '$n^{th}$' uplink allocation interval is immediate first slot following end of '$x-1^{th}$' partition in the '$n^{th}$' uplink allocation interval. The last transmit time interval of the '$x^{th}$' partition is '$r^{th}$' transmit time interval of the '$n^{th}$' uplink allocation interval which ends at an offset greater than or equal to 'T1' from the beginning of the '$x^{th}$' HARQ feedback control region of the downlink subframe 'Fn+1'. It should be noted that '$r+1^{th}$' transmit time interval of the '$n^{th}$' uplink allocation interval should be at an offset greater than or equal to 'T3' from the '$n+1^{th}$' HARQ feedback control region in the downlink subframe '$F_n$'.

For the last partition, the first transmit time interval of the last partition of the 'n$^{th}$' uplink allocation interval is the transmit time interval that is at an offset greater than or equal to 'T3' from the last HARQ feedback control region in the downlink subframe 'F$_n$'. The last transmit time interval of the last partition of the 'n$^{th}$' uplink allocation interval is the last transmit time interval of the 'n$^{th}$' uplink allocation interval of the first carrier.

At step 204, the base station 102 transmits the resource allocation information to the mobile station 104 in the resource allocation region of the downlink subframe on the second carrier. The resource allocation information indicates resources allocated for transmitting the HARQ packet in one of the partitions in the uplink allocation interval. At step 206, the mobile station 104 transmits the HARQ packet to the base station 102 in the transmit time interval in corresponding said one of the partitions of the uplink allocation interval on the first carrier according to the resource allocation information. At step 208, the base station 102 determines whether the HARQ packet is received from the mobile station in the transmit time interval corresponding to said one of the partitions of the uplink allocation interval.

Accordingly, at step 210, the base station 102 determines an uplink HARQ feedback control region in a subsequent downlink subframe in which HARQ feedback information is to be transmitted to the mobile station 104. According to the present invention, multiple time division multiplexed uplink HARQ feedback control regions (also referred to as Physical Hybrid-ARQ Indicator Channel (PHICH)) spans entire downlink subframe of the second carrier. One of the HARQ feedback control regions correspond to a control region of the downlink subframe (i.e., legacy PHICH region) while remaining of the HARQ feedback control regions correspond to data region (downlink SCH region) of the downlink subframe. Each HARQ feedback region in the downlink subframe 'Fn' starts at an offset greater equal to time required to receive the HARQ packet and prepare the HARQ feedback information by the base station 102 from end of corresponding partition in uplink allocation interval which correspond to a downlink subframe 'F$_{n-1}$', and ends at an offset greater equal to time required to process the HARQ feedback information and generate the HARQ packet for retransmission by the base station 102 from start of corresponding partition in 'n$^{th}$' uplink allocation interval which correspond to the downlink subframe 'F$_n$'.

The first HARQ feedback control region in the downlink subframe 'F$_n$' of the second carrier is legacy control region of the downlink subframe 'F$_n$'. The two conditions are satisfied for first HARQ feedback control region by following methods:

a) the size of the first partition is determined such that end of the first partition in the 'n–1$^{th}$' allocation Interval is at an offset equal to time 'T1' from the start of HARQ feedback control region in the downlink subframe 'F$_n$'; and b) The offset equals to 'T2' between the start of uplink allocation interval and the end of the resource allocation region of the downlink subframe ensures that the offset between the end of the first HARQ feedback control region in the subframe 'F$_n$' and the start of first partition in the 'n$^{th}$' uplink allocation interval is greater than time duration 'T3'.

The second HARQ feedback region in the downlink subframe 'F$_n$' of the first carrier starts from end of the legacy control region. The first condition is satisfied for the second HARQ feedback control region by controlling size of the second partition in the 'n$^{th}$' uplink allocation interval. The size of the second partition is decided such that the end of the second partition in the 'n–1$^{th}$' uplink allocation interval is at an offset equal to 'T1' from the start of the second HARQ feedback region in the downlink subframe 'F$_n$'. The end of the second HARQ feedback control region is also the start of third HARQ feedback control region if there are more than two partitions in the uplink allocation interval of the first carrier. The end of the second HARQ feedback region is decided such that the second condition for the second HARQ feedback control region and the first condition for the third HARQ feedback control region are satisfied.

The intermediate HARQ feedback control region in the downlink subframe of the second carrier starts from end of previous HARQ feedback control region. The end of intermediate HARQ feedback control region is also start of next HARQ feedback control region. The start of intermediate HARQ feedback control region is determined such that the first condition for the intermediate HARQ feedback control region and the second condition for the previous HARQ feedback control region are satisfied. The end of the intermediate HARQ feedback control region is determined such that the second condition for the intermediate HARQ feedback control region and the first condition for the next HARQ feedback control region are satisfied.

The last HARQ feedback control region ends at the boundary of the downlink subframe of the first carrier. The second condition for the last HARQ feedback control region is met by controlling start of the last partition in the uplink allocation interval. The last partition in the 'n$^{th}$' uplink allocation interval starts at an offset equal to 'T3' from the end of the last HARQ feedback control region in the downlink subframe 'F$_n$'. The start of the last HARQ feedback control region is determined such that the first condition for the last HARQ feedback control region and the second condition for the previous HARQ feedback control region are satisfied.

In one exemplary implementation, the base station 102 indicates resources for multiple HARQ feedback control regions in a legacy control region in the downlink subframe. The resources may indicate a single feedback region which spans all slots of a DLSCH region. The logical division of the single feedback region in time is performed as per boundaries of the HARQ feedback control regions, as illustrated in FIG. 3b. It is understood that, the resource allocated for the HARQ feedback control region may be specific to the mobile station 104 or a group of mobile stations or same across all mobile stations in an asymmetric multicarrier communication network environment. In another exemplary implementation, resources for the multiple HARQ feedback control regions in the DL-SCH region of the downlink subframe may be predefined and fixed. In yet exemplary implementation, the base station 102 signals resources allocated for the multiple HARQ feedback control regions in the DL-SCH region of the downlink subframe using a broadcast channel. In further another exemplary implementation, the base station 102 indicates resources allocated for the HARQ feedback control regions in the DL-SCH region of the downlink subframe during activation of a second carrier.

At step 212, the base station 102 transmits the HARQ feedback information corresponding to the HARQ packet transmission in the determined HARQ feedback region of the downlink subframe on the second carrier. At step 214, the mobile station 104 processes the HARQ feedback information received in the determined HARQ feedback region. At step 216, the mobile station 104 determines whether the HARQ packet was successfully received by the base station 102 based on the HARQ feedback information. If the mobile station 104 determines that the HARQ packet is not received by the base station 102, then at step 218, the mobile station 104 retransmits the HARQ packet in a transmit time interval of one of the partitions in a subsequent uplink allocation interval on the first carrier. The process steps 210 to 218 continues till the base station 102 successfully receives the HARQ packet from the mobile station 104 or maximum number of HARQ packet transmissions is reached.

Figure 3A:
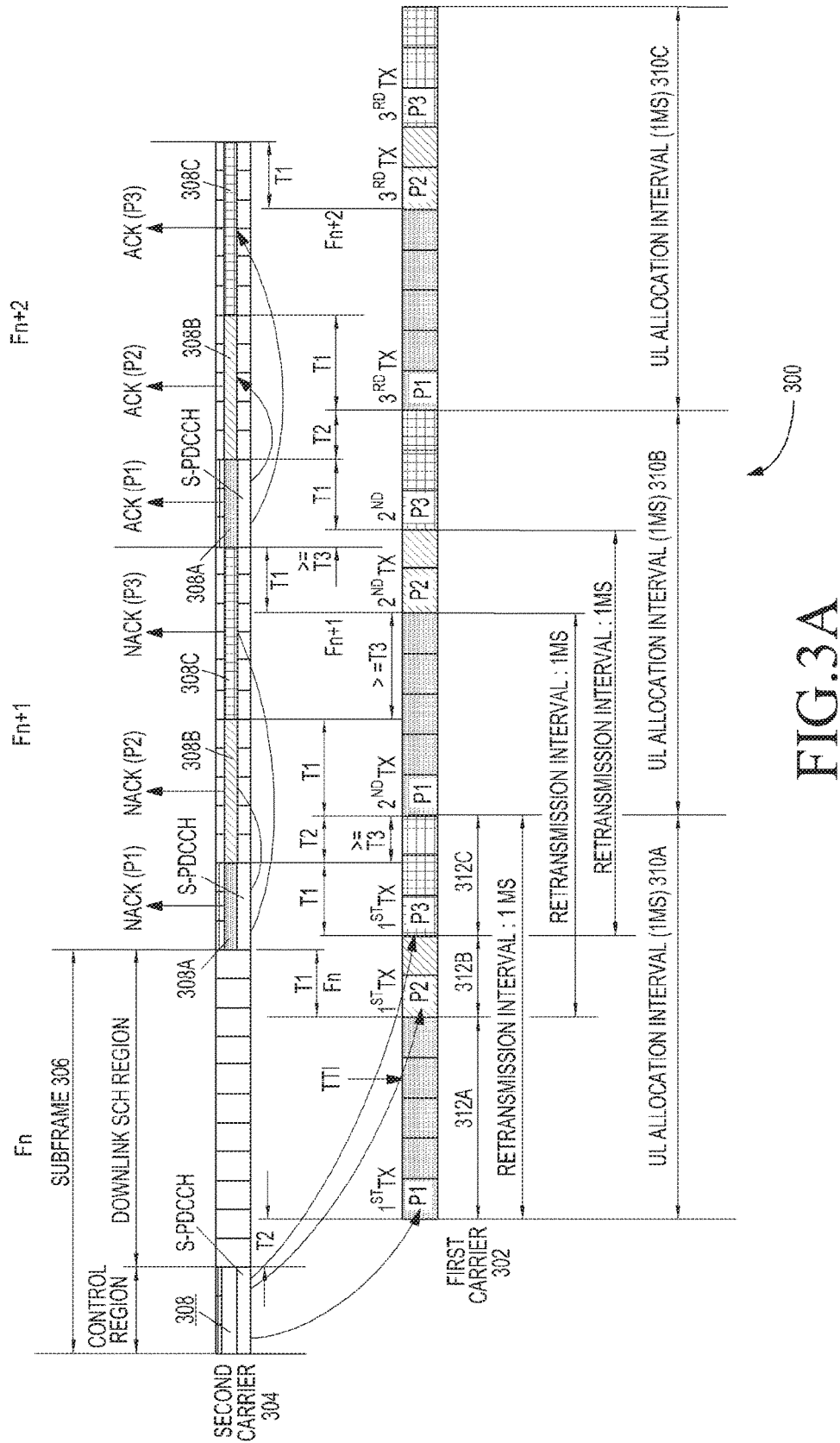
FIG. 3a is a schematic representation illustrating an exemplary uplink HARQ operation in the asymmetric multicarrier communication network environment, according to one embodiment.
Figure 3B:
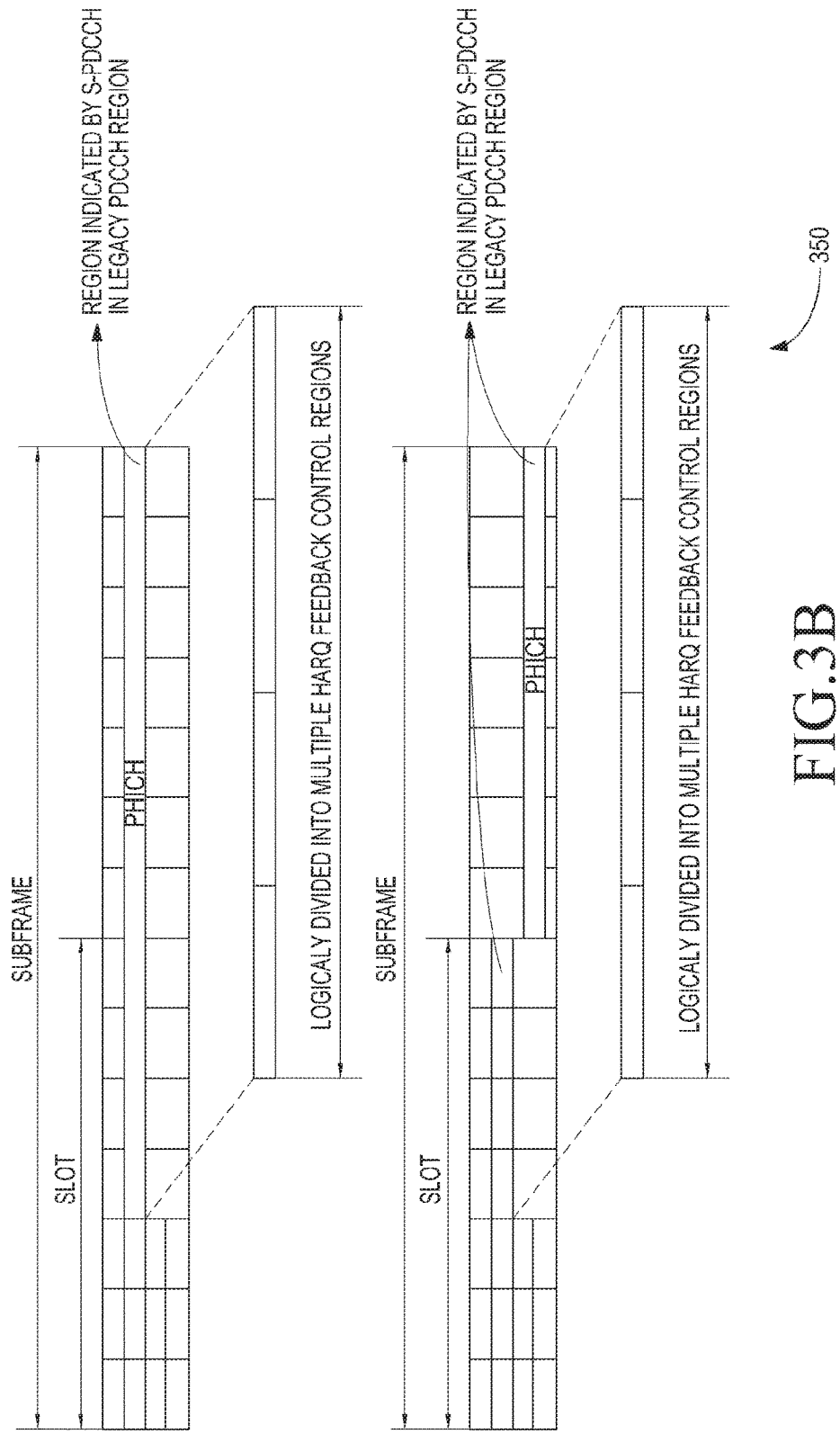
FIG. 3b is a schematic representation illustrating logical divisions of a single feedback region in time, according to one embodiment.

FIG. 3a is a schematic representation 300 illustrating an exemplary uplink HARQ operation in an asymmetric multicarrier communication network system, according to one embodiment. In FIG. 3a, a first carrier 302 and a second carrier 304 are depicted. The first carrier 302 may be a high frequency carrier and the second carrier 304 may be a low frequency carrier. In an exemplary implementation, the second carrier 304 may be a primary carrier and the first carrier 302 may be a secondary carrier. In another exemplary implementation, the second carrier 304 may be a first secondary carrier and the first carrier 302 may be a second secondary carrier. It can be seen that from FIG. 3a that, the first carrier 302 is asymmetric carrier with respect to the second carrier 304, wherein HARQ control information is sent on the second carrier 302 and HARQ packet is sent on the first carrier 302.

As shown in FIG. 3a, each downlink subframe 306 of the second carrier 304 consists of three time division multiplexed uplink HARQ feedback control regions 308A, 308B and 308C. The uplink HARQ feedback control region 308A is located in a legacy PHICH region of the downlink subframe 306 while the HARQ feedback control regions 308B and 308C are located in a downlink SCH region of the downlink subframe 306. Each of the uplink HARQ feedback control regions 308A-C can carry HARQ feedback information for one or more HARQ packets from one or more mobile stations (e.g., the mobile station 104). Each of HARQ feedback control regions 308A-C in the downlink subframe ($F_{n+1}$) 306 in the second carrier 304 starts at an offset greater than or equal to time T1 from the end of corresponding one of the partitions 312A-C in the 'n$^{th}$' uplink allocation interval 310A of the first carrier 302 which corresponds to the downlink subframe ($F_n$) 308 in the second carrier 304, and ends at an offset greater than or equal to time T3 from the start of corresponding one of the partitions 312A-C in the 'n+1$^{th}$' uplink allocation interval 310B which corresponds to the downlink subframe ($F_{n+1}$) 306 in the second carrier 304. The value of 'T1' is equal to time required to receive a HARQ packet, process the HARQ packet and prepare HARQ feedback information corresponding to the HARQ packet by the base station 102. The value of 'T3' is equal to time required to process HARQ feedback information and generate the HARQ packet for retransmission by the mobile station 104. One skilled in the art would understand that the downlink subframe may contain more than three HARQ feedback control regions.

As depicted, each of the uplink allocation intervals 310A-C of the first carrier 302 is divided into ten TTIs. Also, each of the uplink allocation intervals 310A-C is offset from a respective downlink subframe 306 of the second carrier 304 by a time period (T2) required to prepare an uplink HARQ packet after receiving resource allocation information for HARQ packet transmission. As can be seen in FIG. 3a, each of the uplink allocation intervals 310A-C is partitioned into three partitions 312A, 312B and 312C. For example, the partition 312A consists of first five TTIs of the uplink allocation interval 310A. The partition 312B consists of two TTIs of the uplink allocation interval 310A and the partition 312C consists of three TTIs of the uplink allocation interval 310A. As illustrated in FIG. 3a, each of the partitions 312A-C starts in the 'n$^{th}$' uplink allocation interval 310A corresponding to the downlink subframe 'Fn' 306 at an offset greater than or equal to time 'T3' from end of corresponding one of the HARQ feedback control regions 308A-C in the downlink subframe 'Fn' 306 of the second carrier 304 and ends at an offset greater than or equal to time 'T1' from start of corresponding one of the HARQ feedback control regions 308A-C in the downlink subframe 'Fn+1' 306 of the second carrier 304. The value of 'T3' is equal to time required to process HARQ feedback information and generate a HARQ packet for retransmission by the mobile station 104. The value of 'T1' is equal to time required to receive a HARQ packet, process the HARQ packet and prepare HARQ feedback information corresponding to the HARQ packet by the base station 102.

It is understood that each of the uplink allocation intervals 310A-C is divided into three partitions 312A-C as each downlink subframe 306 consists of three HARQ feedback control regions 308A-C. Each of the partitions 312A-C is mapped to corresponding one of the HARQ feedback control regions 308A-C.

For example, when the mobile station 104 transmits a HARQ packet in the partition 312A of the 'n$^{th}$' uplink allocation interval 310A on the first carrier 302, the base station 102 transmits HARQ feedback information corresponding to the HARQ packet transmitted in the partition 312A in the HARQ feedback control region 308A in the downlink subframe '$F_{n+1}$' 306 on the second carrier 304. Similarly, when the mobile station 104 transmits a HARQ packet in the partition 312B of the 'n$^{th}$' uplink allocation interval 310A on the first carrier 302, the base station 102 transmits HARQ feedback information corresponding to the HARQ packet transmitted in the partition 312B in the HARQ feedback control region 308B in the downlink subframe 306 on the second carrier 304. Also, when the mobile station 104 transmits a HARQ packet in the partition 312C of the 'n$^{th}$' uplink allocation interval 310A on the first carrier 302, the base station 102 transmits HARQ feedback information corresponding to the HARQ packet transmitted in the partition 312C in the HARQ feedback control region 308C in the downlink subframe '$F_{n+1}$' 306. This is possible since time duration between TTI carrying the HARQ packet and corresponding HARQ feedback control region 308A, 308B or 308C is equal to 'T1'.

In case the HARQ feedback information indicates negative acknowledgment of the HARQ packet, the mobile device 104 retransmits the HARQ packet in a corresponding partition of a subsequent uplink allocation interval on the first carrier 302. For example, the HARQ feedback information received in the HARQ feedback control region 308A in the downlink subframe '$F_{n+1}$' 306, then the mobile station 104 retransmits the HARQ packet, previously transmitted in the partition 312A of the 'n$^{th}$' uplink allocation interval 310A, in a TTI belonging to the partition 312A of the 'n+1$^{th}$' uplink allocation interval 310B on the first carrier 302. This is possible as the duration between the HARQ feedback control region 308A in the downlink subframe '$F_{n+1}$' is 'T2' which is greater than value 'T3', where 'T2' is equal to time required to process resource allocation information and generate a HARQ packet for retransmission. One skilled in the art would realize that, retransmission of the HARQ packet is not possible if the duration between a HARQ feedback control region carrying HARQ feedback information associated with the HARQ packet is less than 'T3'. It can be noted that, HARQ packet transmitted in any TTI of the uplink allocation interval has same retransmission interval (i.e., equal to 1 millisecond).

Figure 4:
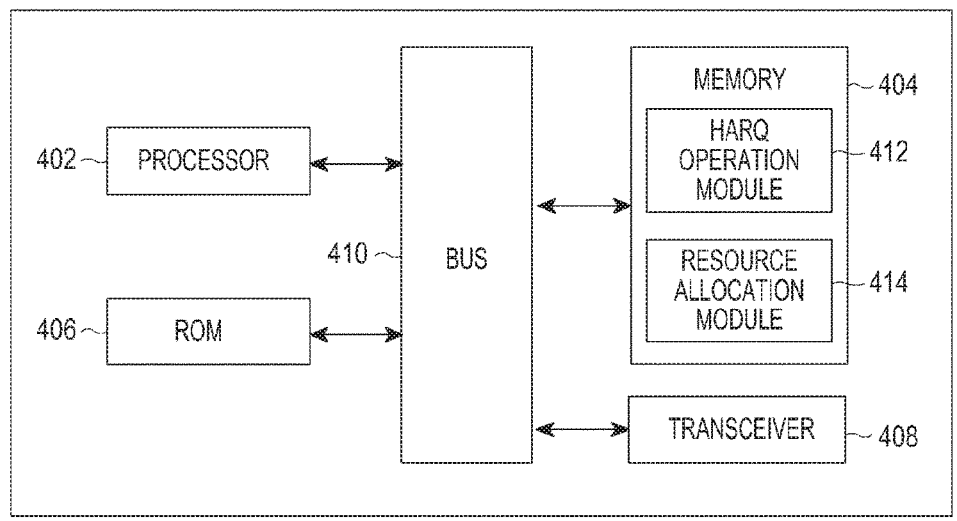
FIG. 4 is a block diagram of an exemplary base station showing various components for implementing embodiments of the present subject matter.

FIG. 4 is a block diagram of an exemplary base station 102 showing various components for implementing embodiments of the present subject matter. In FIG. 4, the base station 102 includes a processor 402, a memory 404, a read only memory (ROM) 406, a transceiver 408, and a bus 410.

The processor 402, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, and the like.

The memory 404 and the ROM 406 may be volatile memory and non-volatile memory. The memory 404 includes a HARQ operation module 412 for receiving HARQ packets and transmitting HARQ feedback, and a resource allocation module 414 for allocating resources and TTIs for transmission of the HARQ packets, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. Although, the memory 404 containing the HARQ operation module 412 and the resource allocation module 414 is shown as a separate entity, one skilled in the art may understand that in some implementations, the memory 404 containing the HARQ operation module 412 and the resource allocation module 414 may be a part of the processor 402.

Embodiments of the present subject matter may be implemented in conjunction with modules, including functions, procedures, data structures, and application programs, for performing tasks, or defining abstract data types or low-level hardware contexts. The HARQ operation module 412 and the resource allocation module 414 may be stored in the form of machine-readable instructions on any of the above-mentioned storage media and may be executed by the processor 402. For example, a computer program may include machine-readable instructions which when executed by the processor 402, may cause the processor 402 to receive HARQ packets and transmit HARQ feedback information and to allocate resources and TTIs for transmission of the HARQ packets, according to the teachings and herein described embodiments of the present subject matter. In one embodiment, the program may be included on a compact disk-read only memory (CD-ROM) and loaded from the CD-ROM to a hard drive in the non-volatile memory.

The transceiver 408 may be capable of transmitting resource allocation information, receiving HARQ packets and HARQ feedback information. The bus 410 acts as interconnect between various components of the base station 102.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module (e.g., HARQ operation module 412 and HARQ operation module 518) for performing the aforementioned functions. Software is storable in a memory unit and executed by the processor. Various means widely known to those skilled in the art can be used as the memory unit or the processor.

Figure 5:
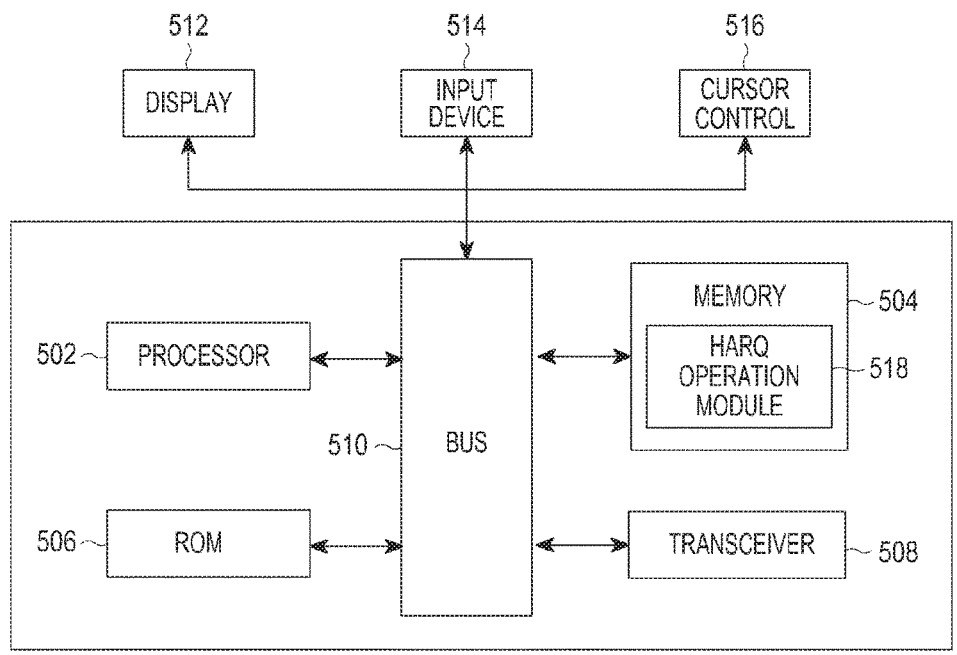
FIG. 5 is a block diagram of an exemplary mobile station showing various components for implementing embodiments of the present subject matter.

FIG. 5 is a block diagram of an exemplary mobile station 104 showing various components for implementing embodiments of the present subject matter. In FIG. 5, the mobile station 104 includes a processor 502, memory 504, a read only memory (ROM) 506, a transceiver 508, a bus 510, a display 512, an input device 514, and a cursor control 516.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

The memory 504 and the ROM 506 may be volatile memory and non-volatile memory. The memory 504 includes a HARQ operation module 518 for generating and transmitting HARQ packets and receiving and processing HARQ feedback information according to uplink HARQ processes, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. Although, the memory 504 containing the HARQ operation module 518 is shown as a separate entity, one skilled in the art may understand that in some implementations, the memory 504 containing the HARQ operation module 518 may be a part of the processor 502.

Embodiments of the present subject matter may be implemented in conjunction with modules, including functions, procedures, data structures, and application programs, for performing tasks, or defining abstract data types or low-level hardware contexts. The HARQ operation module 518 may be stored in the form of machine-readable instructions on any of the above-mentioned storage media and may be executed by the processor 502. For example, a computer program may include machine-readable instructions, that when executed by the processor 502, cause the processor 502 to generate and transmit HARQ packet and receive and process HARQ feedback information according to uplink HARQ processes, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 508 may be capable of transmitting HARQ packets and receiving HARQ feedback information from the base station 102. The bus 510 acts as interconnect between various components of the mobile station 104. The components such as the display 512, the input device 514, and the cursor control 516 are well known to the person skilled in the art and hence the explanation is thereof omitted.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method for operating, by a mobile station, an uplink hybrid automatic repeat request (HARQ) in an asymmetric multicarrier communication network, the method comprising:
   transmitting, to a base station, a packet in a time interval corresponding to one of partitions in an uplink allocation interval on a first carrier;
   determining a feedback region in a subsequent downlink subframe corresponding to the transmitted packet, wherein the subsequent downlink subframe is partitioned into a plurality of feedback regions; and
   receiving, from the base station, feedback information in response to the transmitted packet in the determined feedback region on a second carrier,
   wherein the first carrier and the second carrier comprise different frequency bands.

2. The method of claim 1, further comprising:
   if the feedback information indicates negative acknowledgement corresponding to the transmitted packet, retransmitting, to the base station, the packet in a time interval corresponding to one of partitions of a subsequent uplink allocation interval on the first carrier; and
   receiving resource allocation information in a resource allocation region of the subsequent downlink subframe on the second carrier, wherein the resource allocation information indicates frequency resource for each of the plurality of feedback regions.

3. The method of claim 1, wherein determining the feedback region in the subsequent downlink subframe comprises:
   determining a partition of the uplink allocation interval in which the packet is transmitted; and
   determining the feedback region in the subsequent downlink subframe corresponding to the determined partition of the uplink allocation interval.

4. The method of claim 1, wherein a number of the partitions in the uplink allocation interval is equal to a number of feedback regions in the subsequent downlink subframe on the second carrier, and
   wherein each of the partitions of the uplink allocation interval comprises one or more time intervals.

5. A method of operating, by a base station, an uplink hybrid automatic repeat request (HARQ) in an asymmetric multicarrier communication network, the method comprising:
   monitoring a time interval corresponding to one of partitions of an uplink allocation interval on a first carrier on which a packet transmission is expected from a mobile station;
   determining a feedback region in a subsequent downlink subframe in which feedback information corresponding to the packet transmission is transmitted, wherein the subsequent downlink subframe is partitioned into a plurality of feedback regions; and
   if a packet is received from the mobile station in the time interval, transmitting, to the mobile station, feedback information in response to the received packet in the determined feedback region in the subsequent downlink subframe on a second carrier,
   wherein the first carrier and the second carrier comprise different frequency bands.

6. The method of claim 5, wherein determining the feedback region in the subsequent downlink subframe comprises:
   determining a partition of the uplink allocation interval in which the packet transmission is transmitted; and
   determining the feedback region in the subsequent downlink subframe corresponding to the determined partition of the uplink allocation interval.

7. The method of claim 5, wherein a number of partitions in the uplink allocation interval is equal to a number of feedback regions in the subsequent downlink subframe on the second carrier, and
   wherein each of partitions of the uplink allocation interval comprises one or more time intervals.

8. An apparatus for operating an uplink hybrid automatic repeat request (HARQ) in an asymmetric multicarrier communication network, the apparatus comprising:
   a transceiver;
   a processor operably connected to the transceiver; and
   a memory operably connected to the processor,
   wherein the processor is configured to:
      transmit, to a base station, a packet in a time interval corresponding to one of partitions in an uplink allocation interval on a first carrier;
      determine a feedback region in a subsequent downlink subframe corresponding to the transmitted packet, wherein the subsequent downlink subframe is partitioned into a plurality of feedback regions; and
      receive, from the base station, feedback information in response to the transmitted packet in the determined feedback region on a second carrier, wherein the first carrier and the second carrier comprise different frequency bands.

9. The apparatus of claim 8, wherein the processor is configured to:
   if the feedback information indicates negative acknowledgement corresponding to the transmitted packet, retransmit, to the base station, the packet in a time interval corresponding to one of partitions of a subsequent uplink allocation interval on the first carrier; and
   receive resource allocation information in a resource allocation region of the subsequent downlink subframe on the second carrier, wherein the resource allocation information indicates frequency resource for each of the plurality of feedback regions.

10. The apparatus of claim 9, wherein the processor is configured to:

determine a partition of the uplink allocation interval in which the packet is transmitted; and determine the feedback region in the subsequent downlink subframe corresponding to the determined partition of the uplink allocation interval.

11. The apparatus of claim 9, wherein a number of partitions in the uplink allocation interval is equal to a number of feedback regions in the subsequent downlink subframe on the second carrier, and wherein each of the partitions of the uplink allocation interval comprises one or more time intervals.

12. An apparatus of operating an uplink hybrid automatic repeat request (HARQ) in an asymmetric multicarrier communication network, the apparatus comprising:

a transceiver;

a processor operably connected to the transceiver; and a memory operably connected to the processor, wherein the processor is configured to:

monitor a time interval corresponding to one of partitions of an uplink allocation interval on a first carrier on which a packet transmission is expected from a mobile station;

determine a feedback region in a subsequent downlink subframe in which feedback information corresponding to the packet transmission is transmitted, wherein the subsequent downlink subframe is partitioned into a plurality of feedback regions; and if a packet is received from the mobile station in the time interval, transmit, to the mobile station, feedback information in response to the received packet in the determined feedback region in the subsequent downlink subframe on a second carrier, wherein the first carrier and the second carrier comprise different frequency bands.

13. The apparatus of claim 12, wherein the processor is configured to:

determine a partition of the uplink allocation interval in which the packet transmission is transmitted; and determine the feedback region in the subsequent downlink subframe corresponding to the determined partition of the uplink allocation interval.

14. The apparatus of claim 12, wherein a number of partitions in the uplink allocation interval is equal to a number of feedback regions in the subsequent downlink subframe on the second carrier, and wherein each of partitions of the uplink allocation interval comprises one or more time intervals.

* * * * *